(12) United States Patent
Ikeda (10) Patent No.: US 12,269,347 B2
(45) Date of Patent: Apr. 8, 2025

(54) INVERTER CONTROL APPARATUS

(71) Applicant: Isuzu Motors Limited, Yokohama (JP)

(72) Inventor: Yuta Ikeda, Fujisawa (JP)

(73) Assignee: Isuzu Motors Limited, Yokohama (JP)

(*) Notice: Subject to any disclaimer, the term of this patent is extended or adjusted under 35 U.S.C. 154(b) by 126 days.

(21) Appl. No.: 18/124,659

(22) Filed: Mar. 22, 2023

(65) Prior Publication Data

US 2023/0302916 A1    Sep. 28, 2023

(30) Foreign Application Priority Data

Mar. 24, 2022 (JP) ................. 2022-048775

(51) Int. Cl.
*B60L 15/00* (2006.01)
*B60L 50/51* (2019.01)
*H02M 7/44* (2006.01)

(52) U.S. Cl.
CPC ............. *B60L 15/007* (2013.01); *B60L 50/51* (2019.02); *H02M 7/44* (2013.01); *B60L 2210/40* (2013.01); *B60L 2240/14* (2013.01); *B60L 2240/421* (2013.01); *B60L 2240/423* (2013.01)

(58) Field of Classification Search
CPC .... B60L 15/007; B60L 50/51; B60L 2210/40; B60L 2240/14; B60L 2240/421; B60L 2240/423; H02M 7/44
See application file for complete search history.

(56) References Cited

U.S. PATENT DOCUMENTS

2021/0194396 A1* 6/2021 Katoh ................. B60L 15/20

FOREIGN PATENT DOCUMENTS

JP        07-177609        7/1995

* cited by examiner

*Primary Examiner* — Zoheb S Imtiaz (57) ABSTRACT

A control apparatus of an inverter that controls the drive of a traction motor of a vehicle is described. At a time when the vehicle starts moving by the drive of the traction motor, the control apparatus executes control processing to set a carrier frequency of the inverter to a low frequency within an audible range, and at a time other than when the vehicle starts moving, the control apparatus executes control processing to set the carrier frequency to a high frequency higher than the low frequency.

6 Claims, 5 Drawing Sheets

INVERTER CONTROL APPARATUS

CROSS REFERENCE TO RELATED APPLICATIONS

This application claims the benefit of priority of Japanese Patent Application No. 2022-048775 filed on Mar. 24, 2022, the contents of which are incorporated herein by reference in their entirety.

TECHNICAL FIELD

The present disclosure relates to a control apparatus of an inverter (herein also referred to as "inverter control apparatus"), more specifically, to a control apparatus of an inverter that controls the drive of a traction motor of a vehicle.

BACKGROUND ART

An apparatus that corrects the motor rotation command frequency (carrier frequency) toward a lower frequency according to the amount of depression of an accelerator pedal as the road gradient increases has been proposed (see Patent Literature (hereinafter, referred to as PTL) 1).

CITATION LIST

Patent Literature

PTL 1
Japanese Patent Application Laid-Open No. H07-177609

SUMMARY OF INVENTION

Technical Problem

It is known that setting the carrier frequency of an inverter within an audible range (for example, 20 Hz to 20 kHz) causes emission of magnetic noise from a traction motor whose drive is controlled by the inverter. For the purpose of improving comfort in a vehicle (reducing NVH (noise, vibration, and harshness)), the carrier frequency of an inverter is often set to a high frequency close to the upper limit of the audible range.

In the case of the invention described in PTL 1, even when the carrier frequency of the inverter is set to a high frequency, the carrier frequency becomes low according to the road gradient, and magnetic noise may be generated from the traction motor while the vehicle is traveling. As described above, the sudden generation of abnormal noise while the vehicle is traveling reduces the comfort in the vehicle, thus may cause discomfort to vehicle occupants. Therefore, it is preferred to constantly set the carrier frequency to a high frequency while the vehicle is traveling.

However, as the carrier frequency of the inverter increases, the switching loss increases and the amount of heat generated increases. In order to avoid damage due to such increase in heat generation in the inverter, duration is set in such a way that the higher the carrier frequency, the shorter the duration—the duration being duration of a state in which the rotation shaft of the traction motor, capable of outputting short-time maximum torque, does not rotate (hereinafter referred to as the locked state). As a result, when the vehicle starts moving by the drive of the traction motor, it is necessary to reduce the output torque of the traction motor so as not to exceed the set duration of the locked state, which unfortunately lowers the starting performance of the vehicle. From the foregoing, some improvement is required in order to achieve both an improvement in the comfort in a vehicle and an improvement in the starting performance of the vehicle.

An object of the present disclosure is to provide a control apparatus of an inverter that achieves both an improvement of the comfort in a vehicle and an improvement of the starting performance of the vehicle.

Solution to Problem

A control apparatus of an inverter according to an aspect of the present disclosure for achieving the above-described object is as follows: in the control apparatus of an inverter that controls drive of a traction motor of a vehicle, at a time when the vehicle starts moving by the drive of the traction motor, the inverter control apparatus executes control processing to set a carrier frequency of the inverter to a low frequency within an audible range; and at a time other than when the vehicle starts moving, the inverter control apparatus executes control processing to set the carrier frequency to a high frequency higher than the low frequency.

Advantageous Effects of Invention

According to one aspect of the present disclosure, the carrier frequency is set to a high frequency while a vehicle is traveling, during which magnetic noise is somewhat bothering, and the carrier frequency is set to a low frequency when the vehicle starts moving, which is shorter than the traveling, and thus the magnetic noise is not so bothering. Such a configuration can improve the comfort in a vehicle while the vehicle is traveling, and extend the duration of the locked state when the vehicle starts moving due to the decrease in the carrier frequency, thereby improving the starting performance of the vehicle. Selectively using high and low carrier frequencies depending on the traveling conditions of a vehicle in this way can improve both the comfort in the vehicle and the starting performance of the vehicle.

DESCRIPTION OF EMBODIMENTS

Hereinafter, an inverter control apparatus will be described with reference to the embodiment illustrated in the drawings.

Figure 1:
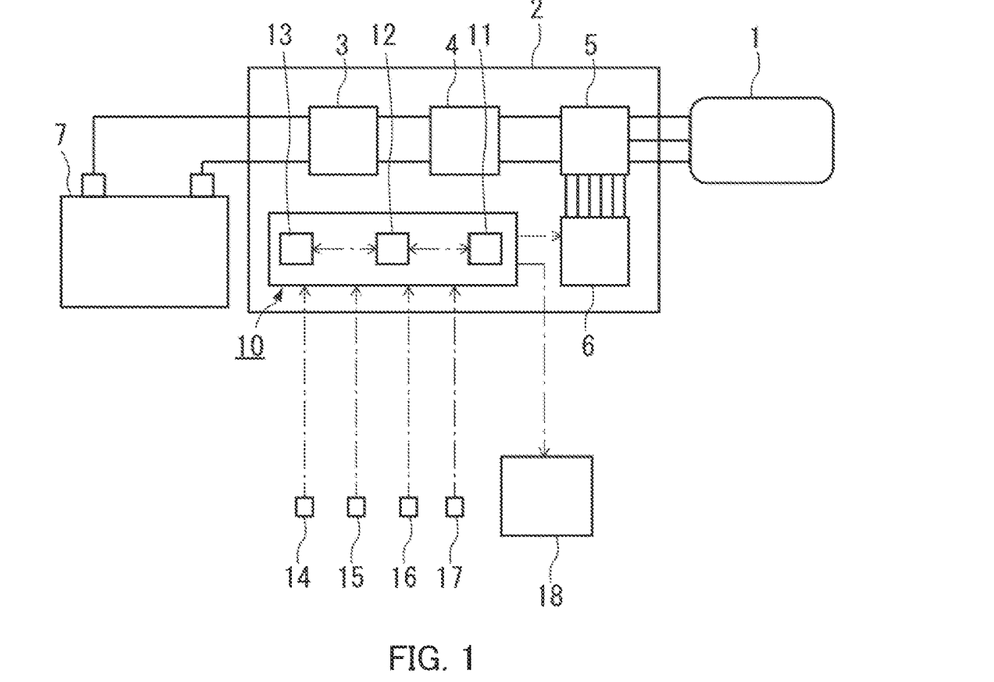
FIG. 1 is an explanatory diagram illustrating an embodiment of an inverter control apparatus.

Traction motor 1 illustrated in FIG. 1 is mounted on various known vehicles (not illustrated), and the drive of the traction motor is controlled by inverter 2. Any of various known electric motors may be used as traction motor 1, which serves as a power source of a vehicle. As the power source of vehicle, an engine may be used in addition to traction motor 1.

Inverter 2 may be an inverter of a known pulse width modulation (PWM) method. Inverter 2 includes a main circuit composed of rectifier circuit 3, smoothing circuit 4, and inverse conversion circuit 5, and control section 6. Inverter 2 transmits a three-phase AC obtained by converting the electric power of battery 7 in the order of rectifier circuit 3, smoothing circuit 4, and inverse conversion circuit 5 to traction motor 1.

Inverse conversion circuit 5 includes a switching element such as an insulated gate bipolar transistor (IGBT) or a metal-oxide semiconductor field-effect transistor (MOSFET), and a gate driver circuit for driving the switching element. Control section 6 generates a carrier wave (triangular wave) signal and a modulated wave (sine wave) signal, and transmits the generated signals to the gate driver circuit. Inverse conversion circuit 5 generates a rectangular pulse by switching the switching element on and off according to the gate driver circuit comparing the carrier wave signal and the fundamental wave signal from control section 6. The average voltage of the generated rectangular pulse forms a pseudo sine wave AC of the three-phase AC. The carrier wave signal generated by control section 6 is based on a set carrier frequency. The modulated wave signal generated by control section 6 is based on the depression amount of the accelerator pedal.

Control section 6 has a protection function, monitors, for example, overcurrent, overvoltage and overload current, and reduces the voltage and frequency of the three-phase AC output from inverse conversion circuit 5. Control section 6 also manages time such as the output time of the continuous operation torque, the output time of the short-time maximum torque Th, and the duration of the locked state. The locked state is defined as a state in which current is supplied from inverter 2 to traction motor 1 but the rotation shaft of traction motor 1 does not rotate. The duration of the locked state varies according to the carrier frequency and the output torque of traction motor 1. The duration of the locked state is negatively correlated with the carrier frequency, and also negatively correlated with the output torque of traction motor 1. The duration of the locked state will be described below.

Figure 2:
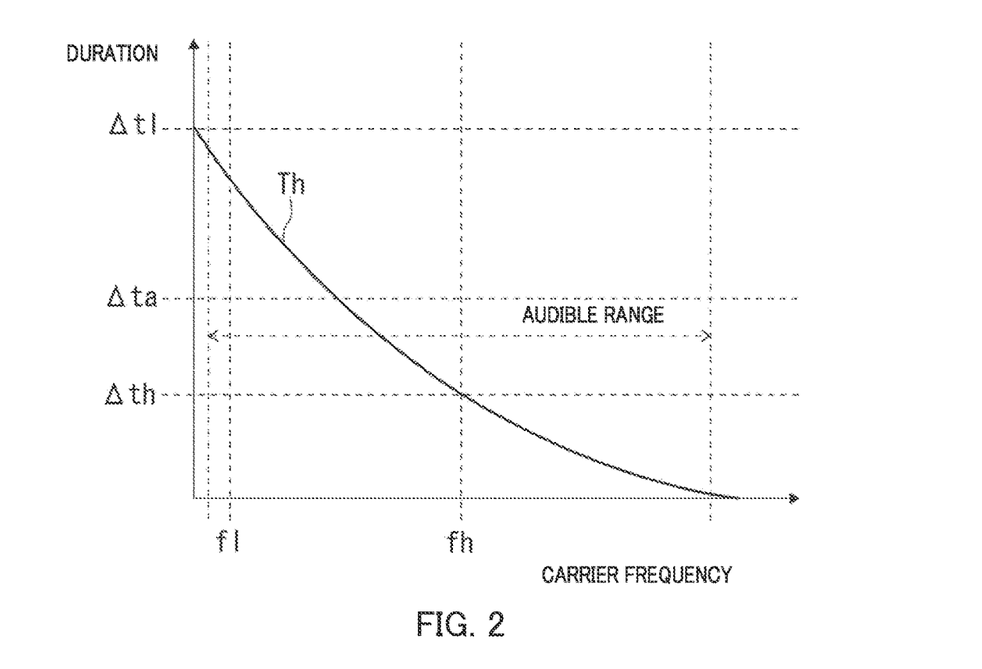
FIG. 2 is a graph indicating the relationship between the carrier frequency of the inverter of FIG. 1 and the duration of a locked state.

FIG. 2 illustrates the relationship between the carrier frequency and the duration of the locked state when the output torque of traction motor 1 is the short-time maximum torque Th. The carrier frequency is set to a low frequency fl within an audible range or to a high frequency fh higher than the low frequency fl. The audible range is the range of sound frequencies that a human ear can hear. The audible range is known to be an approximate range between 20 Hz and 20 kHz (excluding 20 Hz and 20 kHz) although there are individual differences. A sound wave of 20 Hz or less is ultra-low frequency sound, and a sound wave of 20 kHz or more is ultra-high frequency sound. It is also known from literatures known in the art that the audible range has an upper limit of 15 kHz for most humans. In addition, for example, the frequency of the highest notes of musical instruments such as pianos and violins is less than 5 kHz, and the frequency of the lowest notes of pianos is in the vicinity of 20 Hz. From the above, it can be concluded that frequencies of sound that bothers a person is in the range below 5 kHz. In vehicles, sound in this region is generally recognized as noise.

The low frequency fl is within the audible range. The low frequency fl is preferably a frequency on the lower side within the audible range. An exemplary low frequency fl is within the frequency range of sound that bothers a person (the sound recognized as noise). The low frequency fl is preferably set in such a way that the duration of the locked state, when the output torque of traction motor 1 is the short-time maximum torque Th, is longer than the target time Δta when the vehicle starts moving. The target time Δta when a vehicle starts moving is a target time required from when a signal (for example, depression of the accelerator pedal) for the vehicle to start without depending on the inertial mass of the vehicle at the time of moving is issued until the vehicle actually starts moving (driving wheels rotate). The low frequency fl is not limited to one, and a plurality of frequencies may be set within a range in which the duration of the locked state is shorter than the target time Δta. In addition, the low frequency fl may be any frequency at which the three-phase AC wave form transmitted from inverter 2 to traction motor 1 can maintain a pseudo sine wave. The frequency at which the three-phase AC wave form resembles a rectangular wave is excluded from the low frequency fl. Depending on the specifications, some inverters 2 can switch between the sine wave mode and the rectangular wave mode. For such inverters, the low frequency fl may be any frequency that can maintain the sine wave mode.

The high frequency fh is higher than the upper limit of the frequency range of sound that bothers a person (the sound recognized as noise). The high frequency fh may be any frequency of 5 kHz or higher, and more preferably a frequency of 10 kHz or higher. As the high frequency fh, a frequency of 15 kHz or higher or a frequency of 20 kHz or higher may be used depending on the type of switching element in inverse conversion circuit 5 of inverter 2. The high frequency fh is set in such a way that the duration of the locked state, when the output torque of traction motor 1 is the short-time maximum torque Th, is shorter than the target time Δta when the vehicle starts moving.

The duration of the locked state is negatively correlated with the carrier frequency. The duration of the locked state becomes shorter as the carrier frequency becomes higher and longer as the carrier frequency becomes lower. In the locked state, in which the rotation shaft of traction motor 1 does not rotate, a current flows through only one of the three phases. Therefore, in order to avoid heat loss to a circuit such as a switching element, the duration is set to an extremely short instantaneous time (for example, 3 seconds or less) compared to the output time of the short-time maximum torque Th even when the carrier frequency is set to the low frequency fl. The Δth indicates the duration when the carrier frequency is set to the high frequency fh, and the Δtl indicates the duration when the carrier frequency is set to the low frequency fl.

Figure 3:
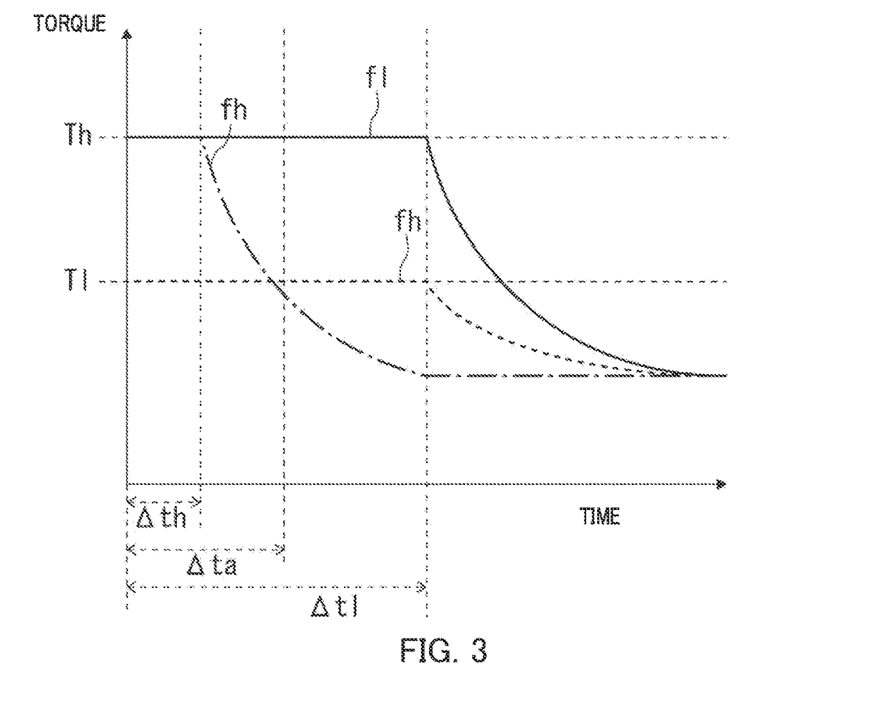
FIG. 3 is a graph indicating the relationship between the output torque of the traction motor in FIG. 1 and the duration of the locked state.

FIG. 3 is a graph indicating the relationship between the output torque and the duration of the locked state. Each of the dashed-dotted line and dotted line indicates the state in which a carrier frequency is set to the high frequency fh. A solid line indicates the state in which the carrier frequency is set to the low frequency fl. Light-start torque Tl indicates torque larger than the minimum torque required to start moving a vehicle from a state where the vehicle is stopped on a flat road (road surface gradient $\beta=0$) with only the driver on board and an empty load. When the carrier frequency is set to the high frequency fh, and the output torque of traction motor 1 is the short-time maximum torque Th, the duration $\Delta$th of the locked state is shorter than the target time $\Delta$ta. When the carrier frequency is set to the high frequency fh, and the output torque of traction motor 1 is the light-start torque Tl, the duration $\Delta$tl of the locked state is longer than the target time $\Delta$ta. That is, the duration of the locked state is negatively correlated with the output torque. The duration of the locked state becomes shorter as the output torque becomes larger, and becomes longer as the output torque becomes smaller. When the carrier frequency is set to the low frequency fl and the output torque of traction motor 1 is the short-time maximum torque Th, the duration of the locked state extends to $\Delta$tl and becomes longer than the target time $\Delta$ta.

The embodiment of control apparatus 10 illustrated in FIG. 1 can use any of various known computers. Control apparatus 10 is typically disposed inside inverter 2, but control apparatus 10 configured separately from inverter 2 may be disposed outside inverter 2. Control apparatus 10 disposed inside inverter 2 may have the function of control section 6. Control apparatus 10 disposed outside inverter 2 may be a vehicle control apparatus for controlling a vehicle.

Control apparatus 10 includes central processing unit (CPU) 11, main memory (RAM) 12, auxiliary memory (ROM) 13, and an input/output section. Control apparatus is connected via the input/output section with road surface gradient acquisition apparatus 14, vehicle weight acquisition apparatus 15, accelerator opening acquisition apparatus 16, and speed acquisition apparatus 17. In addition, control apparatus 10 is connected to control section 6 via the input/output section. Further, control apparatus 10 is connected to braking force holding apparatus 18 via the input/output section. Control apparatus 10 does not have to be directly connected with various sensors, or braking force holding apparatus 18. For example, control apparatus 10 may be connected to the vehicle control apparatus to which the various sensors and braking force holding apparatus 18 are connected. Control apparatus 10 then may acquire values, acquired by the various sensors, from the vehicle control apparatus, or may transmit signals to braking force holding apparatus 18 from the vehicle control apparatus.

Road surface gradient acquisition apparatus 14 is configured to acquire the gradient (road surface gradient) $\beta$ of the road surface on which the vehicle is traveling or stopped. Any of various known road surface gradient acquisition apparatuses may be used as road surface gradient acquisition apparatus 14. For example, a G-sensor that outputs the road surface gradient $\beta$ as a percentage (%) may be used. Vehicle weight acquisition apparatus is configured to acquire the weight m of a vehicle. Any of various known vehicle weight acquisition apparatuses may be used as vehicle weight acquisition apparatus 15. For example, an apparatus for estimating the weight m based on an equation of motion in the longitudinal direction of the vehicle may be used. Accelerator opening acquisition apparatus 16 is configured to acquire the depression amount of an accelerator pedal.

Any of various known accelerator sensors may be used as accelerator opening acquisition apparatus 16. Speed acquisition apparatus 17 is configured to acquire the speed of a vehicle. Any of various known vehicle speed sensors may be used as speed acquisition apparatus 17. While the vehicle is stopped, braking force holding apparatus 18 holds the braking force to the vehicle during the period from the release of the brake pedal and the depression of the accelerator pedal until a predetermined holding period $\Delta$tb elapses. Any of various known hill-start assist systems may be used as braking force holding apparatus 18. Braking force holding apparatus 18 may include an apparatus for skid prevention (electronic stability control) with built-in hill-start assist.

When control apparatus 10 is activated, a predetermined program stored in auxiliary memory 13 is activated. According to instructions from the activated program, control apparatus 10 executes control processing to set the carrier frequency of inverter 2 to a low frequency fl within the audible range when the vehicle starts moving, and executes control processing to set the carrier frequency to a high frequency fh higher than the low frequency fl at any time other than when the vehicle starts moving. The set low frequency fl is such that the duration of the locked state based on the low frequency fl becomes equal to or longer than the period from the start of power transmission to traction motor 1 until rotating of the rotation shaft of traction motor 1.

The time when a vehicle starts moving is defined as a period from when the stopped vehicle receives a start signal (for example, depression of the accelerator pedal) until the drive wheels start rotating. That is, the time when a vehicle starts moving is defined as the period from when the supply of power to traction motor 1 from inverter 2 having received a start signal is started until the rotation shaft of traction motor 1 rotates. The time when a vehicle starts moving is an instantaneous period sufficiently short compared with the period during which the vehicle is traveling. During such an instantaneous period, even when traction motor 1 emits magnetic noise by setting the carrier frequency to the low frequency fl, the occupants of the vehicle are less likely to be bothered by the emitted magnetic noise.

Figure 4:
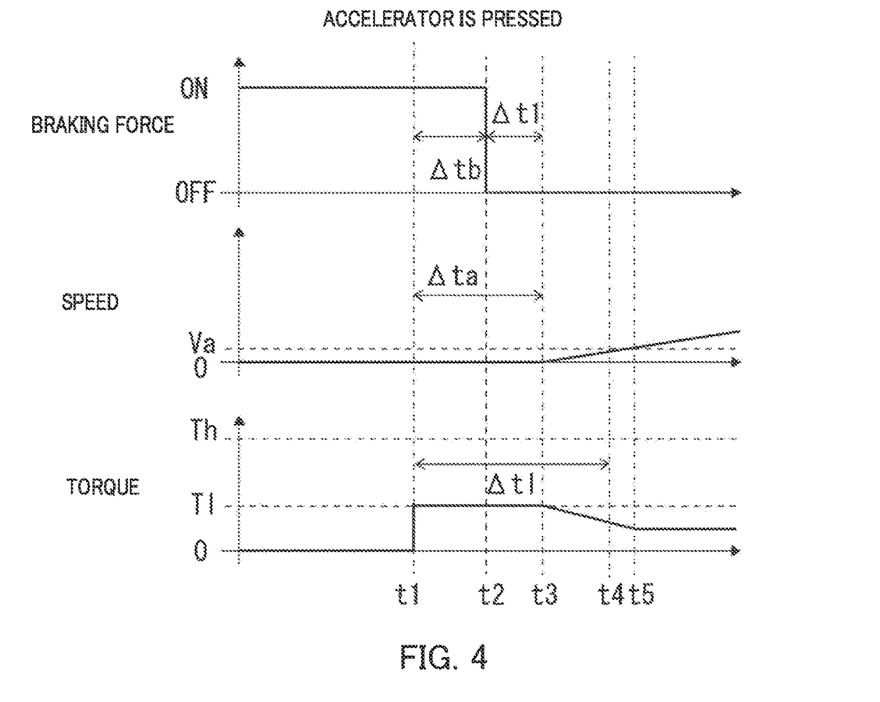
FIG. 4 is an explanatory diagram illustrating changes, when a vehicle of a well-known art starts moving, in the action of the braking force, the speed of the vehicle, and the output torque of a traction motor over time.
Figure 5:
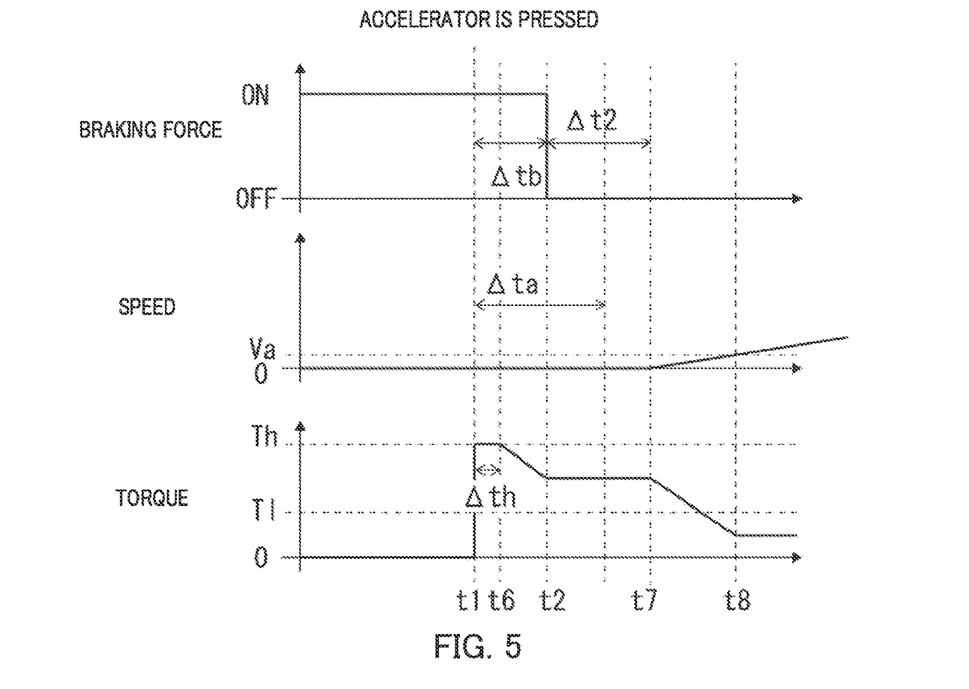
FIG. 5 is an explanatory diagram illustrating changes, when the vehicle of the well-known art starts moving, in the action of the braking force, the speed of the vehicle, and the output torque of the traction motor over time.
Figure 6:
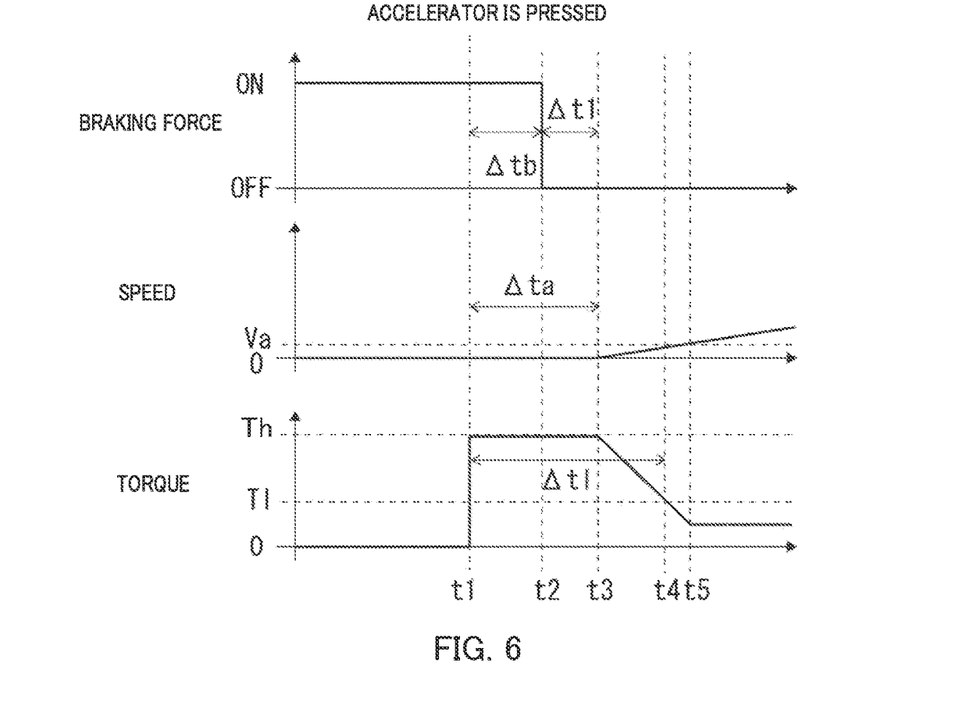
FIG. 6 is an explanatory diagram illustrating changes, when a vehicle equipped with a control apparatus of FIG. 1 starts moving, in the action of the braking force, the speed of the vehicle, and the output torque of the traction motor over time.

FIGS. 4 to 6 illustrate exemplary changes in the action of the braking force by braking force holding apparatus 18, the speed of a vehicle acquired by speed acquisition apparatus 17, and the output torque of traction motor 1 over time when the vehicle starts moving. The larger the inertial mass when the vehicle starts moving become, the worse the movement of the vehicle at the start becomes. Therefore, increasing the output torque of traction motor 1 in accordance with the inertial mass when the vehicle starts moving can avoid the worsening of the movement of the vehicle at the start. The torque corresponding to the inertial mass when the vehicle starts moving is thus set to be larger than the minimum torque required to start the vehicle. The target time $\Delta$ta when the vehicle starts moving is not limited, but preferably the shorter the better. The target time $\Delta$ta is preferably a period of time such that the movement of the vehicle at the start feels smooth.

The example of FIG. 4 illustrates when a vehicle of the known art starts moving, and sets the carrier frequency to the high frequency fh when the vehicle starts moving. In the example, it is assumed that the vehicle is empty, with only the driver on board, and starts moving from a state where the vehicle is stopped on a flat road (road surface gradient $\beta=0$). The torque corresponding to the inertial mass when the vehicle starts moving in this state is the light-start torque Tl. The example of FIG. 5 illustrates when the vehicle of the known art starts moving, and sets the carrier frequency to the high frequency fh when the vehicle starts moving. In the example, it is assumed that the vehicle is loaded with the maximum load, with only the driver on board, and starts moving from a state where the vehicle is stopped on an uphill slope (road surface gradient β>0). The torque corresponding to the inertial mass when the vehicle starts moving in this state is larger than the light-start torque Tl. The example of FIG. 6 illustrates when a vehicle equipped with control apparatus 10 of the present disclosure starts moving, and sets the carrier frequency to the low frequency fl when the vehicle starts moving. In the example, the vehicle is loaded with the maximum load, with only the driver on board, and starts moving from a state where the vehicle is stopped on an uphill slope (road surface gradient β>0). The torque at the starting is the short-time maximum torque Th. Reference signs t1 to t5 indicate time, and are in order from earliest time to latest time. Reference signs t6 to t8 also indicate time, and are in order from earliest time to latest time. The operation at each time (t1 to t8) will be described in detail below.

When the vehicle of the known art illustrated in FIG. 4 starts moving, when accelerator opening acquisition apparatus 16 detects depression of the accelerator pedal, inverter 2 starts energizing traction motor 1, and traction motor 1 outputs the light-start torque Tl by the energization (t1). When the holding period Δtb elapses after accelerator opening acquisition apparatus 16 detects the depression of the accelerator pedal, braking force holding apparatus 18 releases the holding of the braking force (t2). When a predetermined period of time Δt1 elapses after braking force holding apparatus 18 releases the holding of the braking force, the rotation shaft of traction motor 1 starts to rotate (the wheels of the vehicle start to rotate) (t3) before the end time (t4) of the duration Δtl of the locked state. The vehicle starts to move and the speed thereof reaches a speed Va that can be detected by speed acquisition apparatus 17 (t5). When this vehicle starts moving, the period obtained by summing the holding period Δtb and the predetermined period Δt1 is the target time Δta, and the vehicle starts smoothly.

When the vehicle of the known art illustrated in FIG. 5 starts moving, the vehicle starts moving on an uphill slope in addition to the increased weight m of the vehicle; thus the inertial mass when the vehicle starts moving increases. Therefore, the torque corresponding to the inertial mass of the vehicle becomes larger than the light-start torque Tl. When this vehicle starts moving, traction motor 1 first outputs the short-time maximum torque Th (t1). However, as the carrier frequency is set to the high frequency fh, the duration Δth of the locked state is short, and ends earlier than the holding period Δtb of the braking force by braking force holding apparatus 18 (t6). After braking force holding apparatus 18 releases the holding of the braking force, a torque smaller than the short-time maximum torque Th and larger than the light-start torque Tl is then output (t2). As the output torque is smaller than the short-time maximum torque Th, the predetermined period Δt2 after the holding of the braking force is released is longer than the predetermined period Δt1 in the example of FIG. 4. Therefore, in the operation thereafter, time (t7) at which the rotation shaft of traction motor 1 starts to rotate (the wheels of the vehicle start to rotate) and time (t8) at which the vehicle starts to move and the speed thereof reaches the speed Va that can be detected by speed acquisition apparatus 17 are also later than those in the example of FIG. 4. When this vehicle starts moving, the period obtained by summing the holding period Δtb and the predetermined period Δt2 exceeds the target time Δta. As described above, when a vehicle of the known art starts moving, the starting performance of the vehicle decreases when the inertial mass when the vehicle starts moving increases.

When the vehicle equipped with control apparatus 10 of the present disclosure illustrated in FIG. 6 starts moving, setting the carrier frequency to the low frequency fl allows the duration Δtl of the locked state (in which the output torque is the short-time maximum torque Th) to be longer than the starting time obtained by summing the holding period Δtb and the predetermined period Δt1. That is, before the duration Δtl of the locked state of traction motor 1 elapses (t4), the rotation shaft of traction motor 1 starts to rotate (the wheels of the vehicle start to rotate) (t3). As the result of setting the carrier frequency to the low frequency fl when the vehicle starts moving in this way, the duration of the locked state (in which the output torque is the short-time maximum torque Th) extends to Δtl. Therefore, a state (in which the short-time maximum torque Th can be output) can be maintained without reducing the output of traction motor 1 until the rotation shaft of traction motor 1 starts to rotate. Therefore, the vehicle equipped with control apparatus 10 of the present disclosure starts moving smoothly because even when the inertial mass when the vehicle starts moving increases, the period obtained by summing the holding period Δtb and the predetermined period Δt1 equals the target time Δta.

According to the present embodiment as described above, the carrier frequency is set to a high frequency fh while a vehicle is traveling, during which magnetic noise is somewhat bothering, and the carrier frequency is set to a low frequency fl when the vehicle starts moving, which is shorter than the traveling, and thus the magnetic noise is not so bothering. Therefore, it is possible to improve the comfort in a vehicle while the vehicle is traveling, and also extend the duration of the locked state when the vehicle starts moving, thereby improving the starting performance of the vehicle. Selectively using high and low carrier frequencies depending on the traveling conditions of a vehicle in this way can improve both the comfort in the vehicle and the starting performance of the vehicle.

The carrier frequency may be set at any value as long as the carrier frequency is set to the low frequency fl when vehicle starts moving, and set to the high frequency fh other than when the vehicle starts moving. However, as in the example of FIG. 4, the starting performance of the vehicle can be maintained even when the carrier frequency is set to the high frequency fh when the vehicle starts moving. In a situation where the starting performance of the vehicle can be maintained, setting the carrier frequency to the high frequency fh even when the vehicle starts moving can reduce the frequency of accompanying magnetic noise to be generated. Therefore, when the vehicle starts moving, it is preferred to determine the start of execution of control processing to set the carrier frequency to the low frequency fl based on the inertial mass when the vehicle starts moving.

Figure 7:
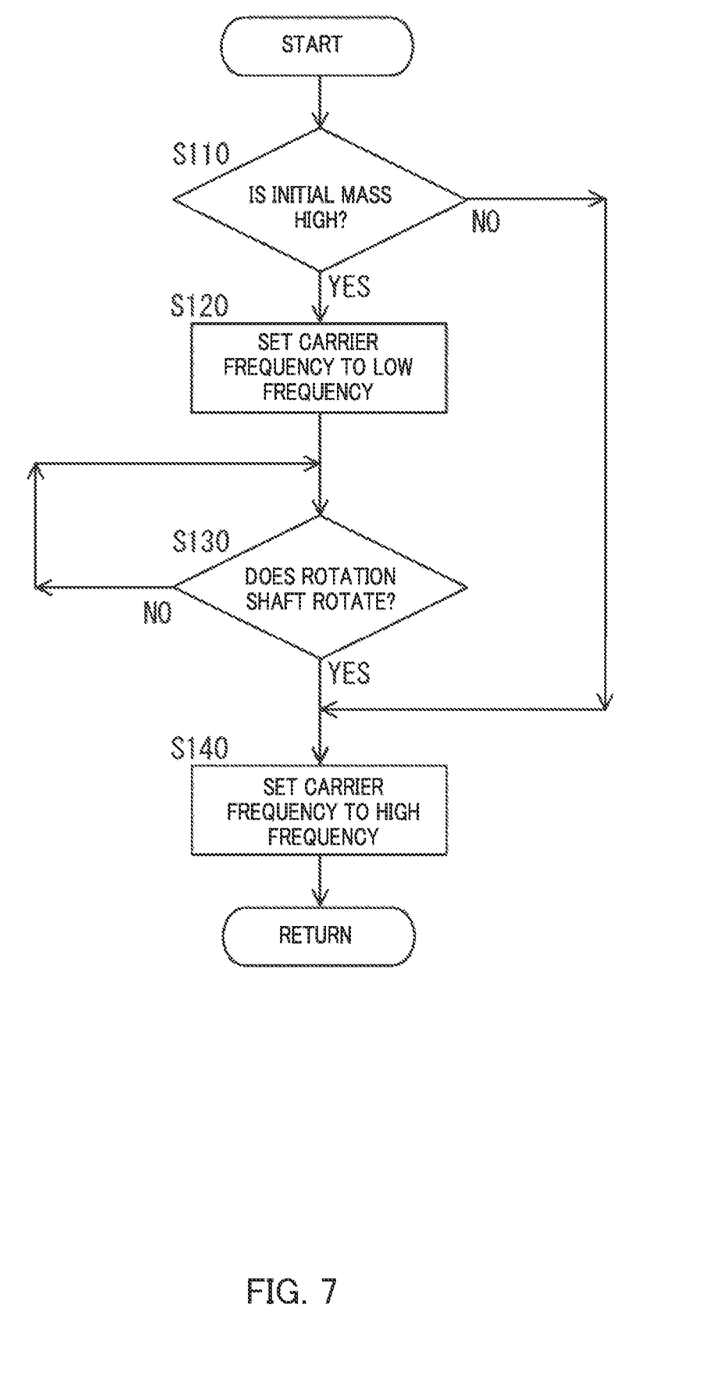
FIG. 7 is a flowchart illustrating an example of a method for controlling the inverter when the vehicle starts moving.

FIG. 7 illustrates an exemplary method for controlling inverter 2. In a method of allowing a stopped vehicle to start move by the drive of traction motor 1, this control method is for determining whether or not to start execution of control processing to set the carrier frequency to a low frequency fl based on the inertial mass when the vehicle starts moving. First, a determination is performed based on the inertial mass of the vehicle (S110). Next, based on the determination result, the carrier frequency is set to either the low frequency fl or the high frequency fh (S120 or S140).

When the carrier frequency is set to the low frequency fl (S120), determination is performed based on the rotation shaft of traction motor 1 (S130), and the carrier frequency is set to the high frequency fh (S140). Each step of S110 to S140 will be described in detail below.

In the step (S110) of performing determination based on the inertial mass, control apparatus 10 executes data processing to determine whether to perform the step (S120) of setting the carrier frequency to the low frequency fl or the step (S140) of setting the carrier frequency to the high frequency fh, based on the inertial mass when the vehicle starts moving. The inertial mass when a vehicle starts moving is positively correlated with the torque output from traction motor 1 at the time of starting the vehicle (torque corresponding to the inertial mass when the vehicle starts moving).

In this step (S110), the determination thus can be performed by using the correlation. Specifically, the correlation between the inertial mass and the torque when starting the vehicle is obtained in advance by experiments, tests, or computer simulations. When starting the vehicle, the inertial mass is calculated by summing the inertial mass based on the resistance acting on the stopped vehicle and the inertial mass of rotating bodies of the vehicle, such as the drive wheels and reduction gear. A torque corresponding to the calculated inertial mass is specified by using the calculated inertial mass and the previously obtained correlation. It is then determined whether or not the torque corresponding to the inertial mass when the vehicle starts moving is equal to or less than the light-start torque Tl. When the torque corresponding to the inertial mass when the vehicle starts moving is equal to or less than the light-start torque Tl, the carrier frequency is set to the high frequency fh. When the torque required for starting the vehicle is larger than the light-start torque Tl, the carrier frequency is set to the low frequency fl. A threshold value may be set based on the previously obtained correlation, and the determination may be performed by comparing the inertial mass when the vehicle starts moving with the set threshold value. Varying the setting of the carrier frequency based on the inertial mass when the vehicle starts moving in this way is advantageous to reduce the frequency of generation of magnetic noise when the vehicle starts moving.

The inertial mass when a vehicle starts moving is the sum of the inertial mass based on the resistance acting on the stopped vehicle and the inertial mass of rotating bodies of the vehicle, such as drive wheels and reduction gear. Although the inertial mass of rotating body is generally constant, the resistance acting on a stopped vehicle varies depending on the road surface resistance $\beta$ and the weight m. Specifically, the inertial mass based on the resistance acting on a vehicle is positively correlated with the road surface gradient $\beta$ when the vehicle is stopped, and increases as the road surface gradient $\beta$ increases. The inertial mass is also positively correlated with the weight m of the vehicle, and increases as the weight m increases.

Therefore, the road surface gradient $\beta$ acquired by road surface gradient acquisition apparatus 14 when the vehicle is stopped can be used as the determination index in this step (S110). The weight m acquired by vehicle weight acquisition apparatus 15 can also be used as the determination index. When the road surface gradient $\beta$ or the weight m is used as the determination index, the correlation between the road surface gradient $\beta$ and the starting time or the correlation between the weight m and the starting time may be used for determination, as in the case of using the inertial mass. In addition, the following is also possible: thresholds respectively corresponding to road surface gradient $\beta$ and weight m are set; and the determination is performed such that the carrier frequency is set to the low frequency fl when the determination index is equal to or larger than at least one threshold, and the carrier frequency is set to the high frequency fh when the determination index is less than at least one threshold. The thresholds for the determination indexes can be obtained by experiments, tests, or computer simulations. Both the road surface gradient $\beta$ and the weight m can be used as the determination indexes. Using the road surface gradient $\beta$ or the weight m as the determination index in the step (S110) in this way can omit the calculation of the inertial mass when the vehicle starts moving, thereby enabling simpler determination. In addition, using both the road surface gradient $\beta$ and the weight m as the determination indexes can determine the inertial mass when the vehicle starts moving with a higher degree of accuracy with a simpler configuration.

In the step (S120) of setting the carrier frequency to the low frequency fl, control apparatus 10 executes control processing to set the carrier frequency to the low frequency fl. The low frequency fl to be set can also be varied stepwise based on the determination in the step (S110). For example, when the correlation between the inertial mass when the vehicle starts moving and the torque corresponding to the inertial mass when the vehicle starts moving is used in the step (S110), the level of the low frequency fl to be set may be changed based on the duration of the locked state corresponding to the magnitude of the specified torque. In addition, when the road surface gradient $\beta$ or the weight m is used as the determination index in the step (S110), the torque corresponding to the inertial mass when the vehicle starts moving with the road surface gradient $\beta$ and the weight m may be specified, and the level of the low frequency fl to be set may be changed based on the duration of the locked state corresponding to the magnitude of the specified torque. The higher the magnitude of the specified torque, the lower the set low frequency fl. Furthermore, when the road surface gradient $\beta$ and the weight m are used as the determination indexes in the step (S110), it is preferred to use a three-dimensional lookup table. The three-dimensional lookup table may be as follows: the X-axis (or row) as the road surface gradient $\beta$, the Y-axis (or column) as the weight m, and the Z-axis (or field) as the low frequency fl (or duration of the locked state).

In the step (S130) of determining whether or not the rotation shaft rotates, control apparatus 10 executes data processing to determine whether or not the rotation of the rotation shaft of traction motor 1 has started, that is, whether or not the rotation of the driving wheels of the vehicle has started. The rotation of the driving wheels is the rotation when the vehicle starts moving in the direction desired by the driver. The detail of this step (S130) is as follows: control apparatus 10 determines that the rotation shaft of traction motor 1 rotates based on the fact that it has become possible for speed acquisition apparatus 17 to acquire the vehicle speed. That is, when the speed of the vehicle reaches the speed Va that can be detected by speed acquisition apparatus 17, it is determined that the rotation shaft of traction motor 1 rotates. In this step (S130), the determination may be performed by using the rotational speed of traction motor 1 monitored by control section 6 of inverter 2 in place of the vehicle speed.

In the step (S140) of setting the carrier frequency to the high frequency fh, control apparatus 10 executes control processing to set the carrier frequency to the high frequency fh. After the vehicle started to move with the carrier frequency set to the low frequency fl, the carrier frequency is reset to the high frequency fh in this step (S140). It is thus possible to avoid the generation of magnetic noise during traveling after the starting. In addition, when setting the carrier frequency to the low frequency fl is not necessary, the carrier frequency is set to the high frequency fh when the vehicle starts moving. It is thus also possible to avoid the generation of magnetic noise when the vehicle starts moving. Therefore, the frequency of generation of magnetic noise when the vehicle starts moving can be reduced.

In order to more reliably avoid exceeding of the duration of the locked state when the vehicle starts moving, the time at which traction motor 1 outputs torque (including the short-time maximum torque Th) corresponding to the inertial mass when the vehicle starts moving is preferably brought closer to the time at which braking force holding apparatus 18 releases the holding of the braking force. The time (at which traction motor 1 outputs torque corresponding to the inertial mass when the vehicle starts moving) may be synchronized with the time (at which braking force holding apparatus 18 releases the holding of the braking force). However, in order to maintain safety when the vehicle starts moving, it is preferred that braking force holding apparatus 18 releases the holding of the braking force after traction motor 1 outputs the torque corresponding to the inertial mass when the vehicle starts moving.

As the method for bringing the time (at which traction motor 1 outputs torque corresponding to the inertial mass when the vehicle starts moving) closer to the time (at which braking force holding apparatus 18 releases the holding of the braking force), the following method can be exemplified: shortening the holding period Δtb of the braking force by braking force holding apparatus 18. Specifically, control apparatus 10 preferably executes the following control processing when braking force holding apparatus 18 is operating. As a signal of control processing for braking force holding apparatus 18 to release the holding of the braking force before the holding period Δtb elapses, control apparatus 10 notifies braking force holding apparatus 18 that traction motor 1 has output torque corresponding to the inertial mass when the vehicle starts moving. Braking force holding apparatus 18 can shorten the holding period Δtb by releasing the holding of the braking force upon receiving the notification.

Figure 8:
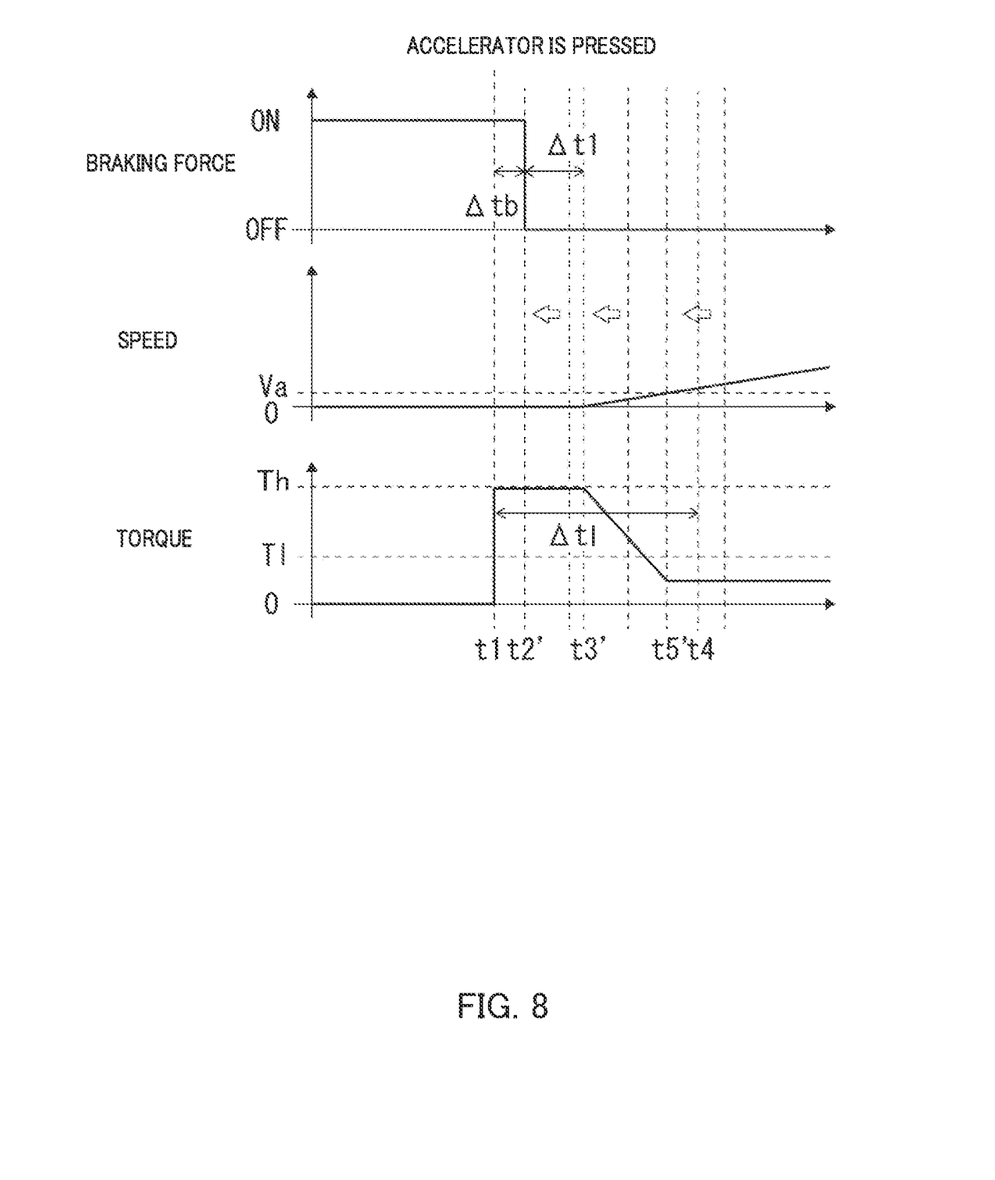
FIG. 8 is an explanatory diagram illustrating changes, when the vehicle equipped with the control apparatus of FIG. 1 starts moving, in the action of the braking force, the speed of the vehicle, and the output torque of the traction motor over time.

FIG. 8 illustrates exemplary changes in the action of the braking force by braking force holding apparatus 18, the speed of a vehicle acquired by speed acquisition apparatus 17, and the output torque of traction motor 1 over time when the vehicle starts moving. The example of FIG. 8 illustrates when the vehicle under the same conditions as in the example of FIG. 6 starts moving. The holding period Δtb in the example of FIG. 8 is shorter than the holding period Δtb in the example of FIG. 6.

When traction motor 1 outputs the short-time maximum torque Th by energization, control apparatus 10 notifies braking force holding apparatus 18 that the output torque of traction motor 1 has reached the short-time maximum torque Th (t1). Braking force holding apparatus 18 then releases the holding of the braking force before the previously set holding period Δtb elapses (t2'). The rotation shaft of traction motor 1 starts to rotate (the wheels of the vehicle start to rotate) earlier corresponding to this shortened time (t3'). The notification from control apparatus 10 to braking force holding apparatus 18 is not limited to the case where the carrier frequency is set to the low frequency fl, but is preferably made also in the case where the carrier frequency is set to the high frequency fh.

By bringing the time (at which traction motor 1 outputs torque corresponding to the inertial mass when the vehicle starts moving) closer to the time (at which braking force holding apparatus 18 releases the holding of the braking force) in this way, the exceeding of the duration of the locked state when the vehicle starts moving can be more reliably avoided. As a result, the starting performance of the vehicle can be improved.

When the vehicle starts moving, the starting time required for the vehicle to start moving is defined as the period obtained by summing the holding period Δtb of the braking force by braking force holding apparatus 18 and the predetermined period corresponding to the inertial mass when the vehicle starts moving. Accordingly, shortening the holding period Δtb can shorten the period of time from the depression of the accelerator pedal until the vehicle actually starts moving, thereby improving the responsiveness when the vehicle starts moving.

As the method for bringing the time (at which traction motor 1 outputs torque corresponding to the inertial mass when the vehicle starts moving) closer to the time (at which braking force holding apparatus 18 releases the holding of the braking force), the following method can also be exemplified: in place of shortening the holding period Δtb, extending the period of time from the start of power transmission from inverter 2 to traction motor 1 until traction motor 1 outputs torque corresponding to the inertial mass when the vehicle starts moving. The duration of the locked state is the duration of a state in which the rotation shaft is not rotating while traction motor 1 outputs torque corresponding to the inertial mass when the vehicle starts moving. Therefore, the exceeding of the duration of the locked state when the vehicle starts moving can be more reliably avoided by the following configuration. The time (from the depression of the accelerator pedal until the output torque of traction motor 1 reaches the torque corresponding to the inertial mass when the vehicle starts moving) is extended to be closer to the time (at which braking force holding apparatus 18 releases the holding of the braking force). However, the time from the depression of the accelerator pedal until the vehicle actually starts moving cannot be shortened by the method of extending the time from the start of power transmission from inverter 2 to the traction motor 1 until traction motor 1 outputs torque corresponding to the inertial mass when the vehicle starts moving. As the method for bringing the time (at which traction motor 1 outputs torque corresponding to the inertial mass when the vehicle starts moving) closer to the time (at which braking force holding apparatus 18 releases the holding of the braking force), the method of shortening the holding period Δtb of the braking force by braking force holding apparatus 18 is thus more preferred.

Although the embodiments of the present disclosure have been described above, the inverter control apparatus of the present disclosure is not limited to specific embodiments, and various modifications and changes are possible within the scope of the present disclosure.

Traction motor 1 and inverter 2 may be configured separately from each other. However, the following configuration is also possible: integrally combined traction motor 1 and inverter 2, or a publicly known electric power train (e.g. e-axle) in which a reduction gear (not illustrated) is integrally combined with the combination.

What is claimed is:

1. A control apparatus of an inverter that controls drive of a traction motor of a vehicle, wherein:
   at a time when the vehicle starts moving by the drive of the traction motor, the control apparatus executes control processing to set a carrier frequency of the inverter to a low frequency within an audible range; and
   at a time other than when the vehicle starts moving, the control apparatus executes control processing to set the carrier frequency to a high frequency higher than the low frequency,
   wherein:
   in the inverter, duration of a state is set based on the carrier frequency, the state being a state in which a rotation shaft of the traction motor does not rotate even when power transmission to the traction motor is performed;
   the duration is negatively correlated with the carrier frequency; and
   the low frequency is set in such a way that the duration becomes equal to or longer than a period from a start of the power transmission to the traction motor until rotating of the rotation shaft of the traction motor.

2. The control apparatus according to claim 1, wherein at the time when the vehicle starts moving, the control apparatus executes data processing to determine whether or not to start execution of the control processing to set the carrier frequency to the low frequency, based on an inertial mass of the vehicle.

3. The control apparatus according to claim 2, wherein the control apparatus uses a road surface gradient when the vehicle is stopped as a determination index for starting the execution of the control processing to set the carrier frequency to the low frequency.

4. The control apparatus according to claim 2, wherein the control apparatus uses a weight of the vehicle as a determination index for starting the execution of the control processing to set the carrier frequency to the low frequency.

5. The control apparatus according to claim 3, wherein as the control processing to set the carrier frequency to the low frequency, the control apparatus varies the carrier frequency stepwise based on the determination index.

6. A control apparatus of an inverter that controls drive of a traction motor of a vehicle, wherein:
   at a time when the vehicle starts moving by the drive of the traction motor, the control apparatus executes control processing to set a carrier frequency of the inverter to a low frequency within an audible range; and
   at a time other than when the vehicle starts moving, the control apparatus executes control processing to set the carrier frequency to a high frequency higher than the low frequency,
   wherein
   when a braking force holding apparatus is operating, the braking force holding apparatus holding a braking force to the vehicle during a period from a depression of an accelerator pedal until elapse of a predetermined holding period,
   the control apparatus notifies the braking force holding apparatus that the traction motor has output torque corresponding to the inertial mass of the vehicle as a signal of control processing for the braking force holding apparatus to release holding of the braking force before the predetermined holding period elapses.

* * * * *